311
X260-105
No. 12,549.
REISSUED OCT. 23, 1906.
M. ERFURT.
PROCESS FOR EMULSIFYING RESIN SOAP IN WATER.
APPLICATION FILED JUNE 9, 1906.
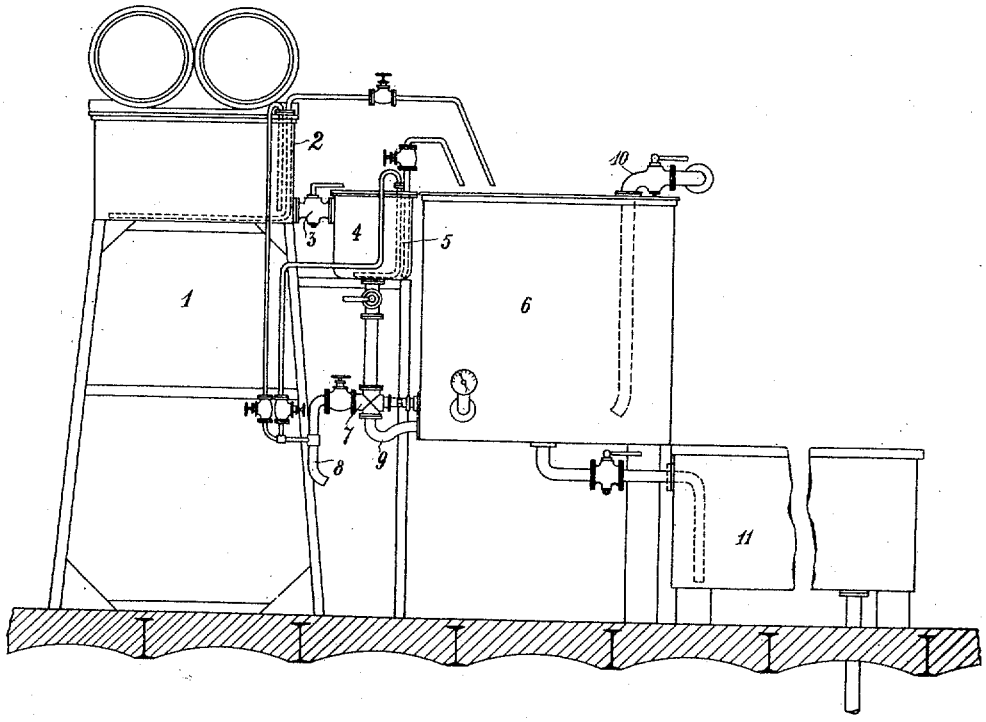
WITNESSES
W. P. Burke
John A. Percival
INVENTOR
Max Erfurt
B. Richards Atty's
15

UNITED STATES PATENT OFFICE.

MAX ERFURT, OF STRAUPITZ, NEAR HIRSCHBERG, GERMANY.

PROCESS FOR EMULSIFYING RESIN SOAP IN WATER.

No. 12,549. Specification of Reissued Letters Patent. Reissued Oct. 23, 1906.

Original No. 781,506, dated January 31, 1905. Application for reissue filed June 9, 1906. Serial No. 321,070.

*To all whom it may concern:*

Be it known that I, MAX ERFURT, a subject of the Emperor of Germany, residing at Straupitz, near Hirschberg, Silesia, Germany, have invented a new and useful Process for Emulsifying Resin Soap in Water, of which the following is a specification.

The manufacture of sizing out of resin soap—*i. e.*, an emulsion of resin soap with hot water—is the more difficult the more free resin is contained in the resin soap. In the ordinary processes of manufacture separation of raw resin takes place, causes considerable loss of product, and may render the resulting sizing unfit for use.

The present invention now has for its object a process by means of which resin soap with an admixture of as high as one hundred per cent. free resin can readily be emulsified in hot water. The result is a resin soap of a very high percentage of free resin and of correspondingly good gluing properties, also a great saving in alum.

The accompanying drawing is a side elevation of the apparatus employed in my improved process.

In carrying out the invention the resin soap is heated in a suitable receptacle 1 by means of steam-coil 2 or some other appropriate source of heat and is then conducted through the connection 3 into a measuring-receptacle 4, where it is still further heated by a steam-coil 5 or the like. On its further way to the receptacle 6, wherein the emulsifying operation is to take place, the heated resin soap passes through a steam and water mixing device 7, preferably of the injector type, said mixing device or injector being adapted to receive steam through the steam-supply pipe 8. By the steam entering the solution within this mixer or injector the temperature of the resin-soap and water solution is still further enhanced, so that the final temperature of about 212° Fahrenheit is obtained. The heated resin-soap and water solution is then atomized by means of the steam-pressure behind it within the mixing device, injected into the water contained in the emulsion-vat, and emulsified therein. The water used in the mixer is preferably taken from the emulsion-vat 6 by means of a pipe 9, connected to the mixer or injector and in communication with the vat, the supply of water being steadily fed to the vat by a supply-pipe 10 for the purpose of keeping up active agitation, thereby aiding the emulsifying process. The result of the described process is a non-settling sizing, which is next conducted into the reservoirs, from where it is run off into the rag-engine.

What I claim, and desire to secure by Letters Patent, is—

Process for emulsifying resin soap in water, consisting in heating resin soap, atomizing and mixing it with hot water under steam-pressure within an injector, raising the temperature of the mixture, and injecting this heated mixture into water, for the purpose of bringing about perfect emulsion, substantially as described.

In testimony that I claim the foregoing as my invention I have signed my name in presence of two subscribing witnesses.

MAX ERFURT.

Witnesses:
A. W. MAN,
LOUIS KATZ.